(12) United States Patent
Chan et al.

(10) Patent No.: US 7,196,316 B2
(45) Date of Patent: Mar. 27, 2007

(54) PORTABLE ELECTRONIC DEVICE WITH ACTIVATION SENSOR

(75) Inventors: Serene Seok Peng Chan, Singapore (SG); Chee Kien Lim, Singapore (SG); Tammy Siew Hoon Ho, Singapore (SG); Wee Sin Tan, Singapore (SG); Freddy Ka Hui Ho, Singapore (SG); Peng Yam Ng, Singapore (SG); Josephine Pei Chen Quek, Singapore (SG); Chi-Boon Ong, Singapore (SG); Sin Heng Lim, Singapore (SG); Kuldeep Kumar Saxena, Singapore (SG)

(73) Assignee: Avago Technologies ECBU IP (Singapore) Pte. Ltd., Singapore (SG)

( * ) Notice: Subject to any disclaimer, the term of this patent is extended or adjusted under 35 U.S.C. 154(b) by 122 days.

(21) Appl. No.: 10/947,088

(22) Filed: Sep. 22, 2004

(65) Prior Publication Data

US 2006/0060762 A1 Mar. 23, 2006

(51) Int. Cl.
*H01J 40/14* (2006.01)
*H04M 1/00* (2006.01)

(52) U.S. Cl. ............... 250/221; 379/388.01; 455/575.3
(58) Field of Classification Search ............ 455/575.3, 455/575.1, 550.1, 552.1, 550, 556; 379/388.01, 379/388.02, 388.06, 428.1, 428.2, 428.3, 379/433.1; 250/221
See application file for complete search history.

(56) References Cited

U.S. PATENT DOCUMENTS

| | | | |
|---|---|---|---|
| 4,847,900 A | 7/1989 | Wakim | |
| 5,224,151 A | 6/1993 | Bowen et al. | |
| 5,335,366 A * | 8/1994 | Daniels | 455/575.5 |
| 5,729,604 A | 3/1998 | Van Schyndel | |
| 5,884,156 A | 3/1999 | Gordon | |
| 6,046,730 A * | 4/2000 | Bowen et al. | 345/168 |
| 6,115,620 A * | 9/2000 | Colonna et al. | 455/569.1 |
| 6,246,862 B1 | 6/2001 | Grivas et al. | |
| 6,269,256 B1 | 7/2001 | Nakamura | |
| 6,628,974 B1 | 9/2003 | Lim | |
| 6,885,849 B1 * | 4/2005 | Kim et al. | 455/90.3 |
| 6,977,645 B2 * | 12/2005 | Brosnan | 345/166 |
| 2001/0011029 A1 * | 8/2001 | Iwabuchi et al. | 455/566 |
| 2002/0158999 A1 | 10/2002 | Shima | |
| 2003/0013496 A1 | 1/2003 | Kim et al. | |
| 2004/0097258 A1 * | 5/2004 | Lee et al. | 455/550.1 |

FOREIGN PATENT DOCUMENTS

| | | |
|---|---|---|
| EP | 1 071 263 A1 | 1/2001 |
| EP | 1 293 998 A2 | 3/2003 |
| EP | 1 408 343 A1 | 4/2004 |

(Continued)

OTHER PUBLICATIONS

UK Patent Search Report, Application GB519086.3, Jan. 19, 2006.
U.K. Search Report dated Dec. 4, 2006 involving counterpart U.K. application no. GB0519086.3.

*Primary Examiner*—Georgia Epps
*Assistant Examiner*—Don Williams

(57) ABSTRACT

An electronic device having a first piece, a second piece moveable with respect to the first piece, and a position sensor operable to sense the position of the second piece relative to the first piece. The electronic device is operated in a first mode or a second mode dependent upon the position of the second piece relative to the first piece. Optionally, a proximity sensor is provided to detect the presence of a body in close proximity to the device when the second piece is in an open position relative to the first piece.

10 Claims, 4 Drawing Sheets

FOREIGN PATENT DOCUMENTS

| | | |
|---|---|---|
| EP | 1 517 520 A2 | 3/2005 |
| JP | 7074691 A | 3/1995 |
| JP | 2001-345902 A | 12/2001 |
| JP | 2003060744 A | 2/2003 |
| WO | WO 00/79769 A1 | 12/2000 |

* cited by examiner

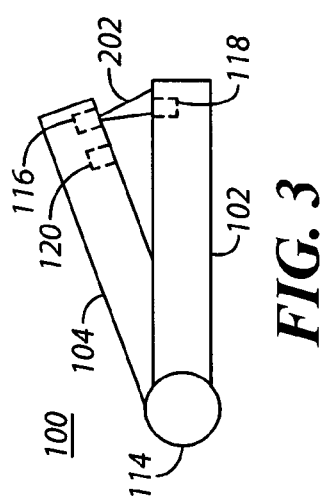
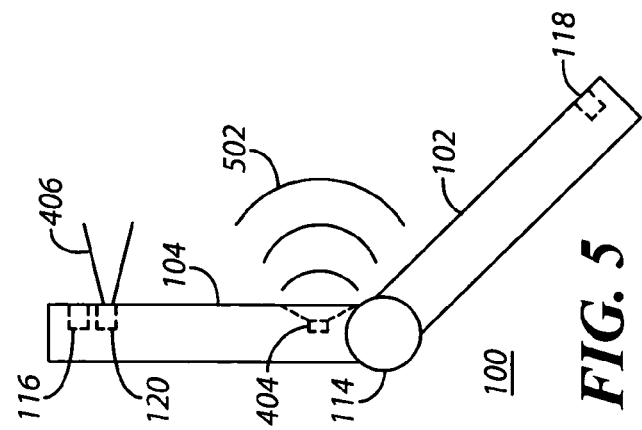
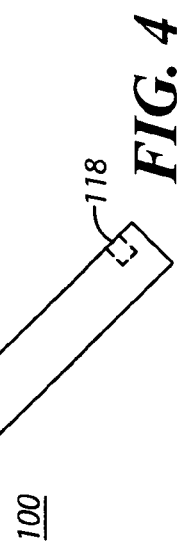
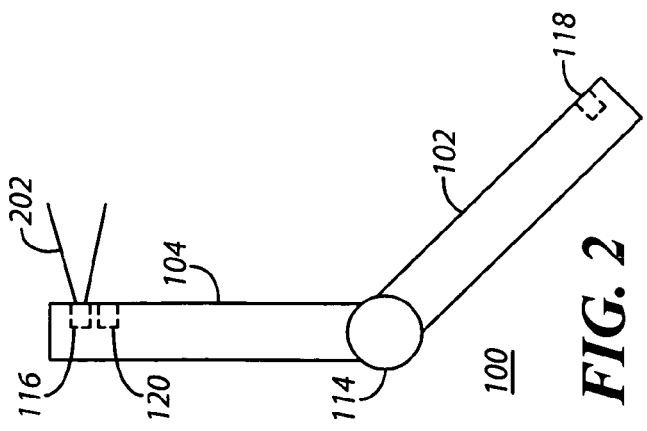

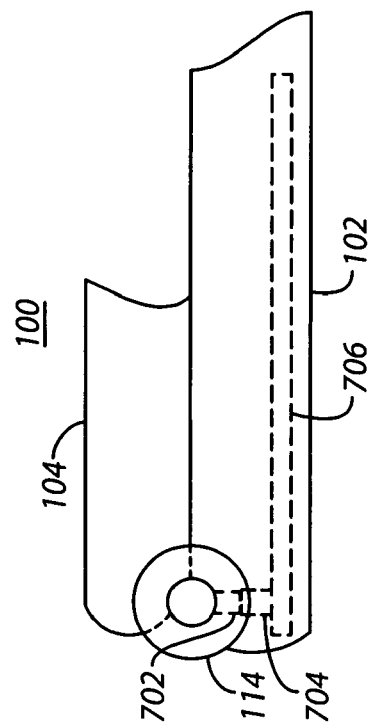
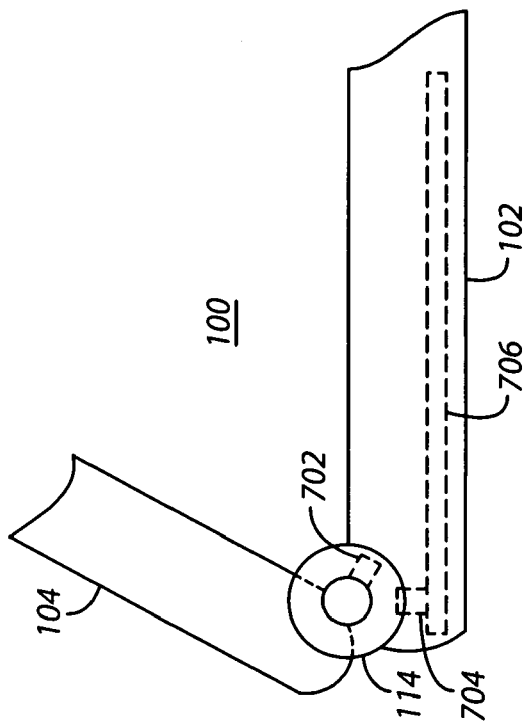
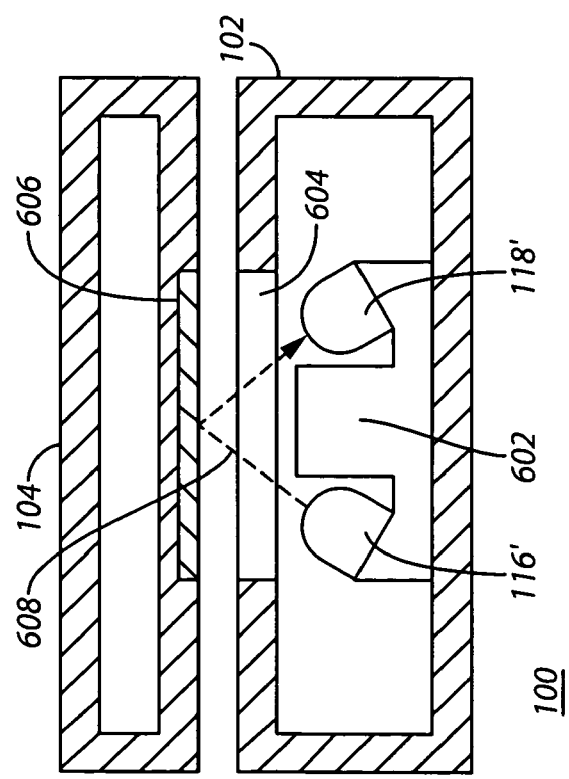

PORTABLE ELECTRONIC DEVICE WITH ACTIVATION SENSOR

FIELD

This invention relates generally to the field of electronic devices. More particularly, this invention relates to a two-piece electronic device, such as a folding radiotelephone having an activation sensor.

BACKGROUND

Electronic devices often comprise two pieces, such as a base and a cover, with the cover providing protection to components of the base. Electronic devices may or may not be portable and may include by way of example and not limitation radiotelephones, PDA's, portable computers, gaming devices, audio and video players, still and video cameras. In some of these examples, the cover or base may contain a display screen that is protected from damage when the cover is closed.

Folding portable radiotelephones, also known as clamshell phones or flip phone, are a popular design. The folding design, which has a base and cover connected by a hinge, allows the portable radiotelephone to be compact and, when closed, the cover provides protection for the keyboard and the display screen. Other portable radiotelephones use sliding covers for similar functionality.

When the cover is closed, the radiotelephone may be switched to a 'standby' mode of operation, in which the screen and other energy consuming operations are deactivated to conserve battery power. Conventionally, a mechanical switch on the hinge is used to detect whether the cover is open or closed. More recently, a Hall Effect sensor has been used to detect when the cover is closed. However, mechanical switches are subject to failure after prolonged use and Hall Effect sensors, which use a magnetic field, may interfere with the radio of the radiotelephone.

The radiotelephone may be activated when the cover is opened.

Some portable radiotelephones may be operated in a speakerphone mode. Operation in a speakerphone mode requires minimal physical interaction with the telephone and is useful for hands-free operation. However, switching the portable radiotelephone from the normal operation mode to the hands-free operation mode requires physical interaction with the radiotelephone, either via a menu function or by pressing a designated shortcut key.

SUMMARY

The present invention relates generally to electronic devices having a base and cover. Objects and features of the invention will become apparent to those of ordinary skill in the art upon consideration of the following detailed description of the invention.

An electronic device in accordance with certain embodiments of the invention has a first piece, a second piece moveable with respect to the first piece, and a position sensor operable to sense the position of the second piece relative to the first piece. The electronic device is operated in a first mode or a second mode dependent upon the position of the second piece relative to the first piece.

One embodiment of the invention relates to a folding radiotelephone, also known as a clamshell phone or flip phone, having a base, a cover moveable between an open position and a closed position with respect to the base, and a sensor operable to sense the position of the cover. The radiotelephone is operated in an activated mode when the cover is in the open position and in a standby or 'off' mode when the cover is in the closed position. Optionally, a proximity sensor is provided to detect the presence of a body in close proximity to the radiotelephone when the cover is in the open position. The radiotelephone is operated in a handset mode when a body is detected in close proximity to the radiotelephone and in a speakerphone mode when no body is detected.

BRIEF DESCRIPTION OF THE DRAWINGS

The novel features believed characteristic of the invention are set forth in the appended claims. The invention itself, however, as well as the preferred mode of use, and further objects and advantages thereof, will best be understood by reference to the following detailed description of an illustrative embodiment when read in conjunction with the accompanying drawing(s), wherein:

FIG. 2 is a side view of an open radiotelephone in accordance with an embodiment of the invention.

FIG. 3 is a side view of a closed radiotelephone in accordance with an embodiment of the invention.

FIG. 4 is a side view of an open radiotelephone in accordance with a further embodiment of the invention.

FIG. 5 is a side view of a closed radiotelephone in accordance with a further embodiment of the invention.

FIG. 6 is a sectional view of a radiotelephone in accordance with a still further embodiment of the invention.

FIG. 7 is a side view of an open radiotelephone in accordance with a still further embodiment of the invention.

FIG. 8 is a side view of a closed radiotelephone in accordance with a still further embodiment of the invention.

DETAILED DESCRIPTION

Figure 1:
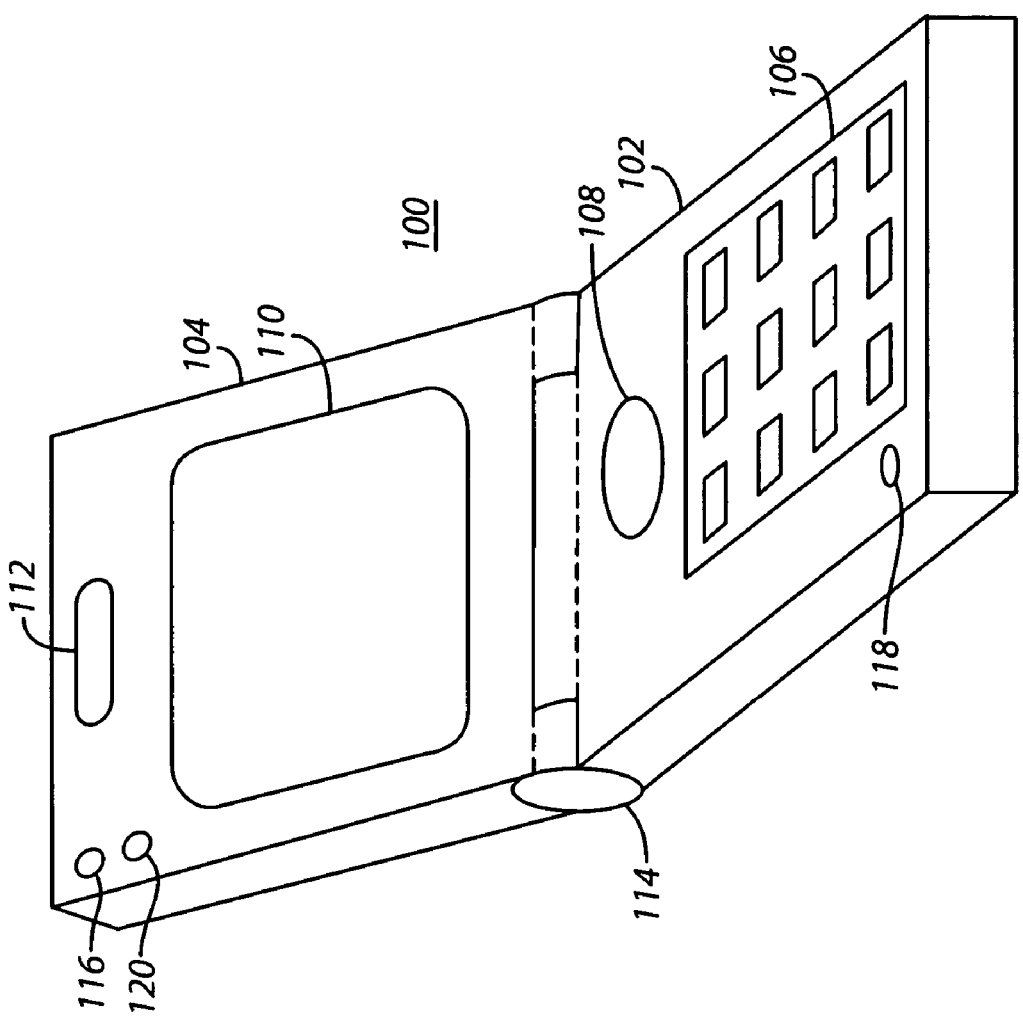
FIG. 1 is a representation of a radiotelephone in accordance with an embodiment of the invention.

While this invention is susceptible of embodiment in many different forms, there is shown in the drawings and will herein be described in detail one or more specific embodiments, with the understanding that the present disclosure is to be considered as exemplary of the principles of the invention and not intended to limit the invention to the specific embodiments shown and described. In the description below, like reference numerals are used to describe the same, similar or corresponding parts in the several views of the drawings.

The present invention relates generally to electronic devices, including, but not limited to, radiotelephones, PDA's, portable computers, gaming devices, audio and video players and still and video cameras, and may or may not be portable. The electronic device is operable in a first mode and a second mode and includes two pieces—a first piece and a second piece. The second piece is moveable between an open position and a closed position with respect to the first piece. The device also includes a processing circuit that is operable to control operation of the device and a photoelectric sensor operable to sense the position of the second piece with respect to the first piece. The electronic device is operated in the first mode when the second piece is in the open position and in the second mode when the second piece is in the closed position.

The term 'closed position' is taken to include partially closed positions as well as fully closed positions and the term 'open position' is taken to include partially open as well as fully open positions. However, it will be apparent to those of ordinary skill in the art that the invention may be used for determining if the second piece is a first range of positions or a second range of positions relative to the first piece.

The second piece may be moveable coupled to the first piece (by a hinge, swivel or slide for example) or may be separable from it.

Certain aspects of the invention are described below with reference to an embodiment in folding radiotelephone, however it should be recognized that the invention is not limited to radiotelephones and is applicable to other electronic devices having two or more pieces.

A representation of an exemplary folding radiotelephone is shown in FIG. 1. Referring to FIG. 1, folding radiotelephone 100 comprises a first piece 102, which is a base in this embodiment, and a second piece 104, which is a cover in this embodiment. The first piece or base 102 may contain a keypad 106 and menu access device 108 for entering information into the radiotelephone and selecting functions of the radiotelephone. The second piece or cover 104 may contain a screen 110 for displaying telephone functions and other information. In one embodiment, the screen is a touch sensitive screen that may be used for entering user information or selecting telephone functions. The cover also contains a speaker 112 for generating sound. The cover is attached to the base by a hinge 114, so that the cover may be moved to an open position (as shown in the figure) when the telephone is in use, or a closed position in which the cover covers the base.

A folding telephone is also referred to as a clamshell phone or a flip phone.

Further, in other embodiments of the invention, the cover is moveably coupled to the base.

In still further embodiments of the invention, the cover is separable from the base.

In accordance with a first aspect of the invention, the radiotelephone is equipped with a photoelectric sensor that is operable to sense whether the cover is in an open position or a closed position. In one embodiment, as shown in FIG. 1, the photoelectric sensor comprises a photo-emitter 116 located in the cover and a photo-detector 118 located in the base. In a further embodiment, the photo-emitter is located in the base and the photo-detector is located in the cover.

In accordance with a further aspect of the present invention, the radiotelephone is equipped with a proximity detector or proximity sensor 120, that may be located in the cover (as shown in the figure) or in the base. When the cover is open, the proximity detector 120 detects the presence of a body in close proximity to the radiotelephone. If a body is detected, it is assumed that the body is the head of the user and the radiotelephone is operated in a normal handheld mode. If no body is detected, it is assumed that the telephone is being used in a speaker-phone mode. In this mode, a loudspeaker is activated to increase the level of the sound generated by the telephone. In addition, an acoustic echo cancellation circuit may be activated to reduce feedback from the loudspeaker to the microphone of the radiotelephone. In this manner, the radiotelephone switches automatically from a handheld mode of operation to a speakerphone mode of operation without intervention from the user. Optionally, a facility may be provided whereby the user can override the automatic mode selection.

A side view of a radiotelephone is shown in FIG. 2. FIG. 2 shows the radiotelephone 100 with the cover 104 in an open position relative to the base 102. In this embodiment of the invention, light 202 is emitted from the photo-emitter 116. The photo-emitter 116 may be an infrared LED, for example. When the cover 104 is open, the light 202 is not received by the photo-detector 118, and the radiotelephone is activated.

FIG. 3 shows the radiotelephone 100 with cover 104 in an almost closed position relative to the base 102. As the cover 104 is closed, light 202 is received by the photo-detector 118, and the radiotelephone is deactivated or placed in a standby mode.

In one embodiment, the photo-detector detects when the photo-emitter is less than 15 mm from the photo-detector.

The photo-emitter may generate a sequence of pulses rather than a continuous beam so as to reduce power consumption.

A side view of a radiotelephone in accordance with a further embodiment of the invention is shown in FIG. 4. In FIG. 4 the cover 104 of the radiotelephone 100 is in an open position relative to the base 102 and hence the radiotelephone is activated. Also in FIG. 4, a user 402 is in close proximity to the radiotelephone 100. The proximity sensor 120 detects the presence of the user and signals the radiotelephone to operate in a normal or handheld mode. In this mode of operation, the loudspeaker 404 is disabled.

The proximity sensor may be an inductive sensor, a capacitive sensor, a magnetic sensor, an eddy current sensor, a photoelectric sensor or an ultrasonic sensor, for example. A photoelectric sensor or an ultrasonic sensor emits a beam 406 that is reflected by the user 402.

When the user is no longer in close proximity to the radiotelephone, as depicted in FIG. 5, the proximity sensors 120 fails to detect the presence of the user and signals the radiotelephone to operate in a hands-free or speakerphone mode. In the speakerphone mode of operation, the loudspeaker 404 is enabled and emits a sound field 502. Additionally, other circuitry may be enabled, such as an acoustic echo canceller, or an alternative microphone. In another hands-free mode of operation, an external speaker and microphone (such as a headphone) may be activated.

In one embodiment of the invention, the proximity sensor 120 has a range of less than 60 mm.

FIG. 6 is a sectional view through the base 102 and cover 104 of a radiotelephone 100. A photo-emitter 116' in the base 102 emits light through an aperture 604. When the cover 104 is in the closed position, as shown in the figure, the light 608 from the photo-emitter is reflected from a reflective surface 606 on the cover 104. The light reflected from the reflective surface 606 is detected by a photo-detector 118'. Light from the photo-emitter 116' is prevented from reaching the photo-detector 118' directly by an opaque barrier 602. When the cover 104 is in an open position, only a small amount of light reaches the photo-detector. Even if an object, such a user's finger, is placed over the aperture, the intensity of the light received by the photo-detector is less than the intensity received when the cover is closed. In operation, the photo-detector produces an electrical signal related to the intensity of the light it receives. The level of this electrical signal is compared to a threshold level to determine if the cover is in an open position or a closed position.

The integral package of the photo-emitter 116', photo-detector 118' and opaque barrier 602 shown in FIG. 6 can serve as the proximity detector 120 of FIG. 1.

Light from the photo-emitter 116 may pass through an emitter lens and light may be received by the photo-detector 118 through a receiver lens, as indicated by the arrow 608. The emitter lens and the receiver lens may be aligned with respect to the reflective surface 604 so as to maximize the reflected light received by the photo-detector.

In an alternative embodiment, the photo-emitter 116, the photo-detector 118 and the aperture 604 are located in the cover, and the reflective surface 606 is located on the base.

Returning to FIG. 1, in a further embodiment the proximity detector 120, such as the proximity detector 120 described with reference to FIG. 6, is located at the position of the photo-emitter 116. The photo-emitter 116 is not needed in this embodiment. The photo-emitter 116' of the proximity detector 120 is used in place of the photo-emitter 116 to determine whether the radiotelephone 100 is open or closed. When the cover 104 is closed as illustrated in FIG. 3, light is received by the photo-detector 118, and the radiotelephone is deactivated or placed in a standby mode. Also, as in FIG. 4, the proximity sensor 120 detects the presence of a body, causing the radiotelephone 100 to switch between the loudspeaker mode and the normal handheld mode. Thus, the proximity detector 120 becomes a "dual-purpose" proximity detector, serving as both a proximity detector and as an emitter.

In yet another embodiment, there is no need for either the photo-emitter 116 or the photo-detector 118 of FIG. 1. As in the immediately previous embodiment, the photo-emitter 116 is replaced with a proximity detector such as the proximity detector 120 described with reference to FIG. 6. Additionally, the photo-detector 118 is replaced by reflective surface 606 of FIG. 6. The proximity detector 120 is used in combination with the reflective surface 606 to determine whether the radiotelephone 100 is open or closed as described above with reference to the embodiment of FIG. 6. Also, as in FIG. 4, the proximity sensor 120 detects the presence of a body, causing the radiotelephone 100 to switch between the loudspeaker mode (also referred to as the speakerphone mode) and the normal handheld mode (also referred to as the handset mode). The intensity of light received by the photo-detector 118' is the least when the phone is open but without the presence of a body, greater when a body is present (blocking the photo-detector 118'), and the greatest when the radiotelephone 100 is closed. The photo-detector 118' produces an electrical signal related to the intensity of the light it receives. Thus, the level of this electrical signal is compared to first and second threshold levels to determine if the phone is open, open with a body present or closed.

A still further embodiment of the present invention is shown in FIG. 7 and FIG. 8. FIG. 7 shows a side view of a radiotelephone 100 with the cover 104 in a partially open position relative to the base 102. A protuberance or stud 702 extends from the hinge 114 and moves with the cover 104. A miniature proximity sensor 704 is located on a circuit board 706 in the base, in close proximity to the hinge 114. The proximity sensor 704 is operable to detect when the protuberance 702 is very close to the proximity detector.

FIG. 8 shows a side view of the radiotelephone 100 with the cover 104 in a closed position relative to the base 102. The protuberance 702 is now very close to the proximity detector 704 and is detected by it. This signals that the cover has been closed and the radiotelephone can be switched to a standby operating mode.

In a still further embodiment of the invention, the proximity detector 704 is located in the cover 104, and the protuberance 702 is located on the base 102.

In a still further embodiment of the invention, the proximity detector 704 is a photo-detector and the protuberance 702 is a photo-emitter.

Figure 9:
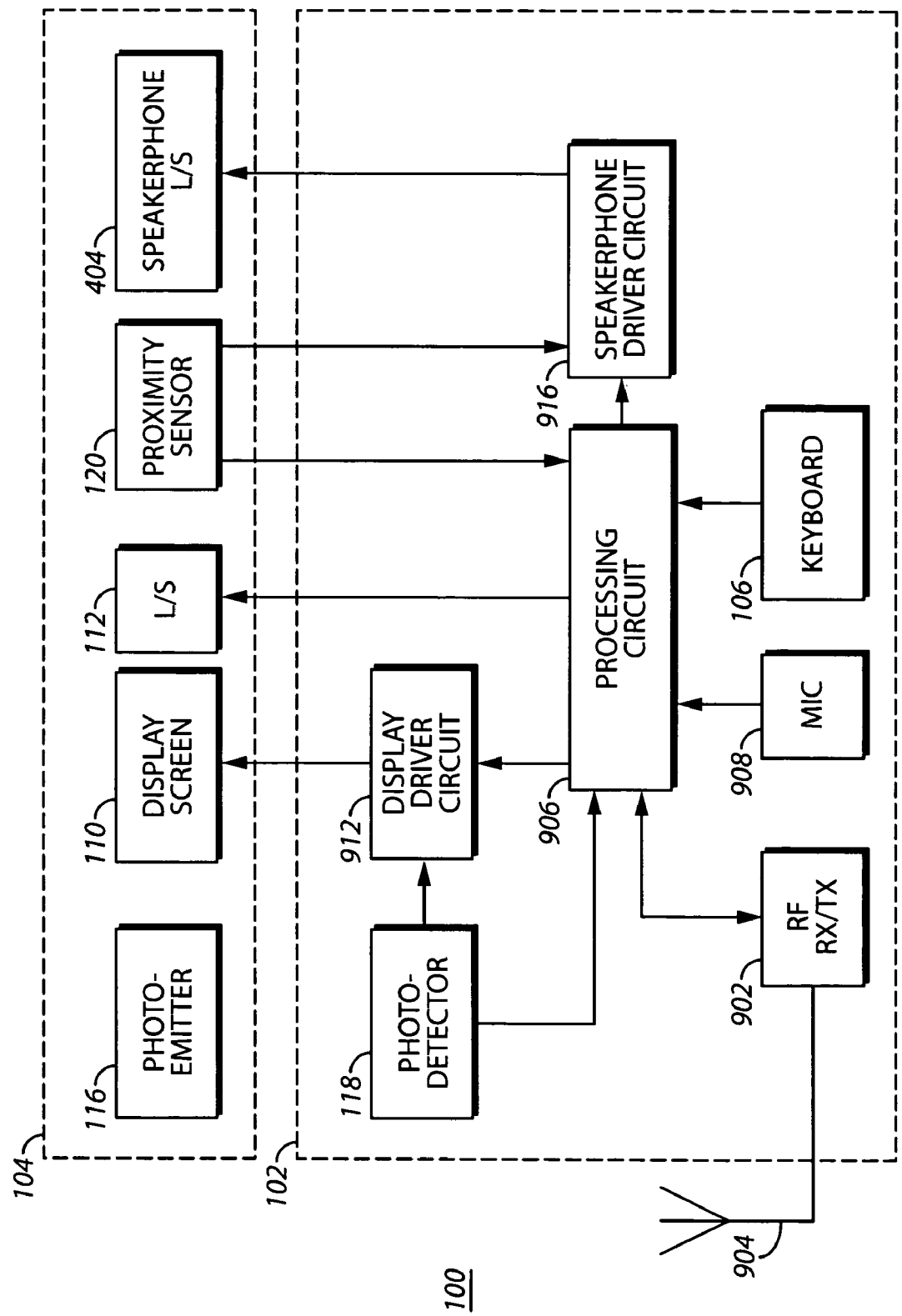
FIG. 9 is diagrammatic representation of a radiotelephone in accordance with an embodiment of the present invention.

A diagrammatic representation of a radiotelephone in accordance with one embodiment of the present invention is shown in FIG. 9. Referring to FIG. 9, the radiotelephone 100 comprises a base 102 and a cover 104. The base 102 contains a radiofrequency transceiver 902 that is coupled to an aerial 904. The radiofrequency transceiver is coupled to a processing circuit 906. The processing circuit 906 also receives audio information from microphone 908 and keyboard 106. The processing circuit controls display driver circuit 912 to drive a display screen 110 in the cover 104. The processing circuit 906 also controls speakerphone circuit 916 to drive a speakerphone loudspeaker 404 that may be located in the cover 104 or the base 102. The processing circuit 906 also provides audio signals to a loudspeaker 112 in the cover 104. A photo-emitter 116 in the cover 104 emits light, such as infrared light, that is received by a photo-detector 118 located in the base 102. In operation, when light is detected by the photo-detector 118, a signal is sent to the display driver circuit 912 and the processing circuit 906 to indicate that a standby mode of operation should be entered. A proximity sensor 120 located in either the cover 104 or the base 102, detects when a body (such as the head of a user) is in close proximity to the radiotelephone. If no body is detected, a signal is sent to the processing circuit 906 and to the speakerphone driver circuit 916 to indicate that the speakerphone mode of operation should be entered.

While the invention has been particularly shown and described with reference to a preferred embodiment, it will be understood by those skilled in the art that various changes in form and detail may be made therein without departing from the spirit and scope of the invention.

While the invention has been described in conjunction with specific embodiments, it is evident that many alternatives, modifications, permutations and variations will become apparent to those of ordinary skill in the art in light of the foregoing description. Accordingly, it is intended that the present invention embrace all such alternatives, modifications and variations as fall within the scope of the appended claims.

What is claimed is:

1. An electronic device, operable in a first mode and a second mode, comprising:
    a) a first piece
    b) a second piece moveable with respect to the first piece;
    c) a processing circuit operable to control operation of the device; and
    d) a photoelectric sensor operable to sense the position of the second piece with respect to the first piece and to switch the device between the first mode and the second mode dependent upon the position of the second piece with respect to the first piece
   wherein the photoelectric sensor comprises a photo-emitter and a photo-detector located in the first piece and positioned to receive light reflected from a reflective region of the second piece when the second piece is in a closed position withe respect to the first piece.

2. An electronic device in accordance with claim 1, wherein the photo-emitter emits light through an emitter lens and the photo-detector receives light through a receiver lens, the emitter lens and the receiver lens being aligned with respect to the reflective region of the second piece so to maximize the amount of light passing from the photo-omitted to the photo-detector.

3. An electronic device, operable in a first mode and a second mode, comprising:
    a) a first piece
    b) a second place moveable with respect to the first piece;

c) a processing circuit operable to control operation of the device; and
d) photoelectric sensor operable to sense the position of the second piece with respect to the first place and to switch the device between the first mode and the second mode dependent upon the position of the second piece with respect to the niece;
wherein the photoelectric sensor comprises a photo-emitter and a photo-detector located in the second piece place positioned to receive light reflected from a reflective region of the first piece when the second piece is in a closed position with respect to the first piece.

4. An electronic device, operable in a first mode and a second mode, comprising:
   a first piece
   b) a second piece moveable with respect to the first piece;
   c) a processing circuit operable to control operation of the device; and
   d) a photoelectric sensor operable to sense the position of the second piece with respect to the first piece and to switch the device between the first mode and the second mode dependent upon the position of the second piece with respect to the first piece;
wherein the photoelectric sensor comprises a photodiode positioned to receive light from an inured LED.

5. A folding radiotelephone operable in a speakerphone mode and a handset mode comprising:
   a) a first piece;
   b) a second piece moveable between an open position and a closed position with respect to the first piece;
   c) a position sensor operable to sense the position of the second piece with respect to the first piece; and
   a proximity sensor operable to detect the presence of a body in close proximity to the radiotelephone when the second piers is in the open position and operable to select the handset mode when a body is detected and the speakerphone mode when no body is detected,
wherein the proximity sensor is a sensor selected from the group consisting of an inductive sensor, a capacitive sensor, an eddy current sensor, and an ultrasonic sensor.

6. A folding radiotelephone operable in a speakerphone mode and a handset mode comprising:
   b) a second piece moveable between an open position and a closed position with respect to the first piece;
   c) a position sensor operable to sense the position of the second piece with respect to the first piece; and
   d) proximity sensor operable to deflect the presence of S body in close proximity to the radiotelephone when the second piece is in the open position and operable to select the handset mode when a body is detected and speakerphone mode when no body is detected;
wherein the proximity sensor comprises a photo-emitter, a first photo-detector and an opaque barrier in an integral package, the opaque barrier being positioned between the photo-emitter and the first photo-detector;
   wherein:
   the position sensor comprises the proximity sensor and a reflective region of the first piece; and
   the photo-detector of the proximity sensor is positioned to receive light emitted by the photo-emitter and reflected from the reflective region of the first piece when the second piece is in a closed position with respect to the tired piece.

7. A tolding radiotelephone operarable in a speakerphone mode and a handset mode, comprising:
   a) a first piece;
   b) a second piece moveable between an open position and a closed position with respect to the first piece;
   c) a first sensing means for sensing the position of the second piece; and
   d) a second sensing means for detecting the presence of a body close to the radiotelephone when the second piece is in the open position;
wherein the radiotelephone is operated in the handset mode when a body is detected and in the speakerphone mode when no body is detected, the folding radiotelephone further comprising a hinge moveable coupling the second piece to the first piece,
wherein me first sensing means comprises:
   a proximity sensor located in close proximity to the hinge; and
   a protuberance extending from the hinge;
wherein the distance between the proximity sensor and the protuberance varies as the second piece is moved between the open position and tho closed position.

8. A folding radiotelephone, operable in a speakerphone mode and a handset mode, comprising:
   a) a first piece;
   b) a second piece moveable between an open position and a closed position with respect to the first piece;
   c) a first photoelectric sensing means for sensing the position of the second piece with respect to the first piece; and
   d) a second sensing means for detecting the presence of a body close to the radiotelephone when the second piece is in the open position;
wherein the radiotelephone is operated in me handset mode when a body is detected and in the speakerphone mode when no body is detected, and wherein the first photoelectric sensing means comprises a photo-emitter and photo-detector;
   further comprising a hinge moveable coupling the second piece to the first piece,
wherein the first sensing means comprises;
   a photo-detector located in close proximity to the hinge; and
   a photo-emitter located on the hinge;
wherein the photo-detector and the photo-emitter are in substantial alignment when the cover is moved to the closed position.

9. An electronic device, operable in a first and a second mode, comprising:
   a) a first piece;
   b) a second piece coupled by a hinge to the first piece and moveable with respect to the first piece;
   c) a protuberance extending from the hinge; and
   d) a proximity sensor located in close proximity to the hinge such that the distance between the proximity sensor and the protuberance varies as the second piece is moved with respect to the first piece, the proximity sensor operable to sense the position of the second piece relative to the first piece;
wherein the device is switched between the first mode and in the second mode dependent upon the position of the second piece relative to the first piece.

10. An electronic device in accordance with claim 9 wherein the electronic device is a radiotelephone.

* * * * *